United States Patent [19]

Morissette

[11] 4,023,865
[45] May 17, 1977

[54] STAPLE CLEAT FOR SNOWMOBILE TRACK

[75] Inventor: Roger Morissette, Repentigny, Canada

[73] Assignee: Bombardier Limited, Valcourt, Canada

[22] Filed: July 8, 1975

[21] Appl. No.: 593,970

[30] Foreign Application Priority Data
Feb. 14, 1975 Canada .................................. 220134

[52] U.S. Cl. .............................. 305/35 EB; 305/56
[51] Int. Cl.² ........................................ B62D 55/24
[58] Field of Search ............... 180/5 R; 305/21, 24, 305/35 R, 35 EB, 38, 39, 47, 60, 37, 56, 14, 25; 152/230, 210

[56] References Cited
UNITED STATES PATENTS

| 2,117,766 | 5/1938 | Kraft | 152/210 |
| 2,437,143 | 3/1948 | With | 152/210 X |
| 3,690,741 | 9/1972 | Pierson | 305/35 EB |
| 3,722,961 | 3/1973 | Haley et al. | 305/38 X |
| 3,787,099 | 1/1974 | Tucker et al. | 305/25 |
| 3,887,243 | 6/1975 | Chaumont | 305/24 |

Primary Examiner—Robert B. Reeves
Assistant Examiner—John P. Shannon

[57] ABSTRACT

In snowmobile tracks of the endless, internally driven type, high friction because of direct contact between the track and the slide elements of the slide suspension system caused deterioration and subsequent failure of the track. This invention provides a staple cleat installed in the track and positioned so as to provide a sliding interface between the track and the slide element whereby the otherwise destructive friction build-up is considerably reduced.

9 Claims, 6 Drawing Figures

STAPLE CLEAT FOR SNOWMOBILE TRACK

FIELD OF THE INVENTION

This invention relates to a staple cleat for use in a snowmobile track, and more particularly to a staple cleat for use in a snowmobile track of the endless, internally driven type, and to such a track provided with staple cleats.

DESCRIPTION OF THE PRIOR ART

In conventional snowmobile tracks, driving power is provided through a pair of driven sprocket wheels, the teeth of which enter and engage two parallel rows of sprocket holes, the rows being located on opposite sides of the track and extending longitudinally thereof. Ordinarily, reinforcement means for these sprocket holes are provided by the installation of metal strips which are bent into a C shape and which also provide a convenient bearing surface for the runners or slide elements of the slide suspension system in order to reduce the friction that would exist if direct contact between the track and the slides were permitted.

In endless snowmobile tracks of the internal drive type, where the sprocket teeth do not penetrate the track and consequently no sprocket holes are included, teeth or lugs are molded onto the internal surface of the track for engagement with the sprocket. The use of a slide suspension system with an internally driven track has hitherto been unsatisfactory due to the difficulty of finding a suitable friction material for the runners in order to bear against the surface of the rubber track with a minimal friction.

SUMMARY OF THE INVENTION

Accordingly, the invention comprises a metallic staple cleat for use in an endless, internally driven snowmobile track, said staple cleat comprising a convexly curved bearing surface part adapted to slidingly engage the slide element of a snowmobile suspension system and at least two integral teeth mounted on opposite sides of said bearing surface part and extending downwardly and substantially perpendicular thereto, said integral teeth being adapted to penetrate and grippingly engage the snowmobile track when mounted thereon.

The staple cleat may also include either one or two guiding flanges mounted on the ends of the bearing upper surface part which, when the cleat is installed in the track and is under operating conditions, laterally contact the runners of the suspension system and thereby guide the track. More than two penetration teeth may also be used.

From another aspect, the invention comprises a snowmobile track of the internal drive type having an inside surface carrying lugs adapted to be driven by a powered drive sprocket and an external ground engaging surface, a plurality of metallic staple cleats mounted on said track in at least one row, the cleats of the at least one row being adapted to slidingly contact a slide element of the suspension system of the snowmobile, each cleat having a bearing surface part positioned against the inner surface of the track and at least two integral teeth located on opposite sides of said bearing surface part extending substantially perpendicular thereto, said teeth penetrating and grippingly engaging the material of said snowmobile track.

BRIEF DESCRIPTION OF THE DRAWING

The invention will now be described, by way of example only, with reference to the accompanying drawings in which.

DESCRIPTION OF THE PREFERRED EMBODIMENT

Figure 1:
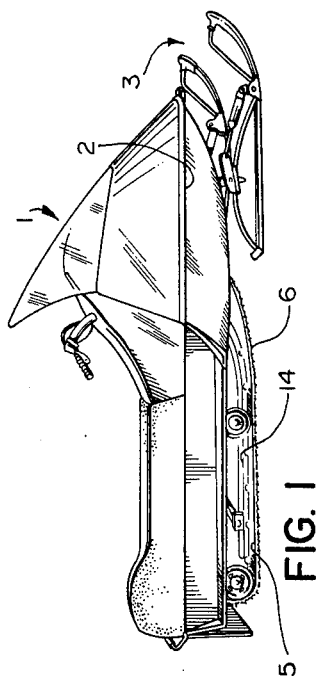
FIG. 1 is a side view of a snowmobile utilising a slide type suspension system with an internally driven track.
Figure 2:
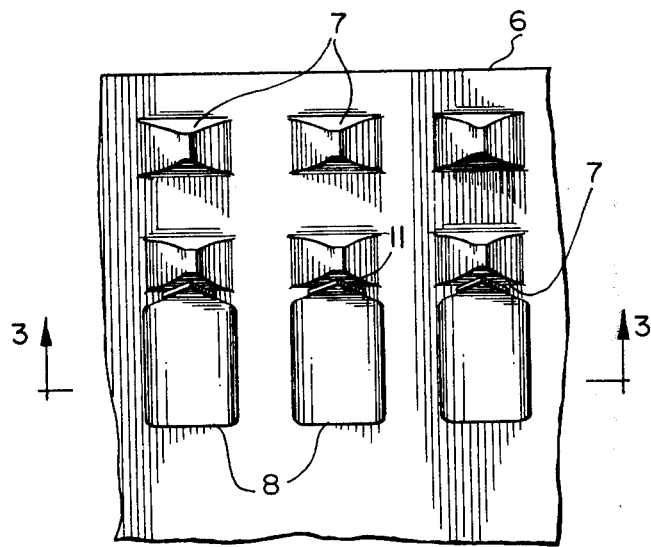
FIG. 2 is a fragmentary plan view of the internal surface of the snowmobile track, FIG. 3 (appearing with FIG. 1) is a sectional view of the snowmobile track taken along 3—3 of FIG. 2.

A snowmobile is shown generally in FIG. 1 and comprises a body 2, a pair of front mounted steerable skis 3, and an endless internally driven track 6 which is powered in known manner by drive sprocket (not shown) and which has an internal surface 5 contacting a pair of slides 14 (only one of which is shown) through installed staple cleats 8 (FIG. 2). Slide 14 is used with the slide suspension system of the snowmobile to provide flexible support for the body 2.

Figure 3:
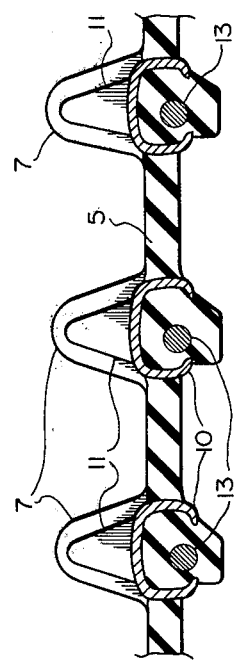

The snowmobile track 6, as best seen in FIGS. 2 and 3, comprises four parallel, longitudinal, continuous rows of lugs 7 (only two rows of which are shown), each of the lugs molded in the shape of a pyramid on the internal surface of the track for engagement by the ribs of the drive sprocket. The remaining configuration of the track, including the external surface, is of conventional form as is the method of track construction.

Figure 5:
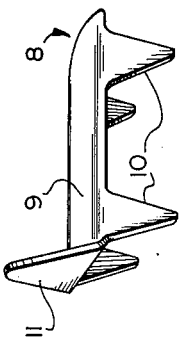
FIG. 5 is a view of one embodiment of the staple view.

The staple cleat 8, as shown in FIG. 5, is made from a suitable sheet metal material such as steel and comprises a bearing surface part 9, downwardly extending teeth 10, and an upwardly and outwardly extending guiding flange 11. The bearing surface part is convexly curved in the longitudinal direction as shown in FIGS. 3 and 5. In working position (FIGS. 2 through 4), the guiding flange 11 is positioned adjacent to an in contact with one side of the inner rows of lugs 7 with the downwardly extending teeth of each lug piercingly penetrating the track 6 on both the leading and trailing sides of the laterally extending, longitudinally spaced reinforcing fiberglass rods 13 (FIG. 2) molded in the track. The bearing surface part 9 lies against the inner surface of the track and the teeth are deformed to grippingly engage the material of the track.

Figure 4:
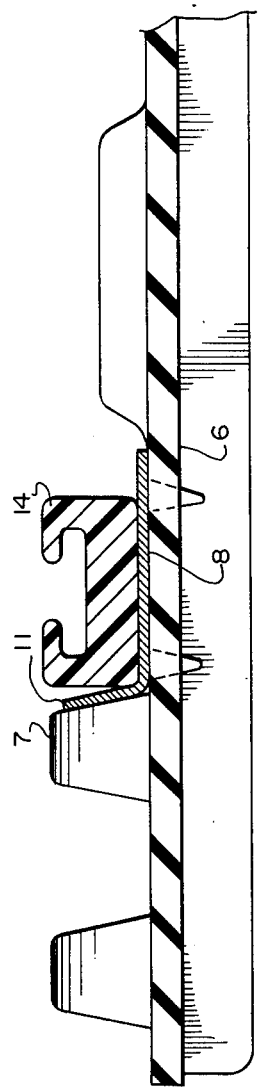
FIG. 4 is a sectional view of the snowmobile track looking forward in FIG. 1.

From FIG. 4, the guiding flange 11 of the staple cleat 8 is seen to contact the slide 14 of the snowmobile suspension system and to provide a sliding interface between the track 6 and the slide 14. Consequently, the friction, which would be of a high and inefficient nature if the slide 14 was in direct contact with the track 6, is considerably reduced under operating conditions and conventional materials for the slide (i.e., ultra high molecular weight polyethylene), may be used.

Figure 6:
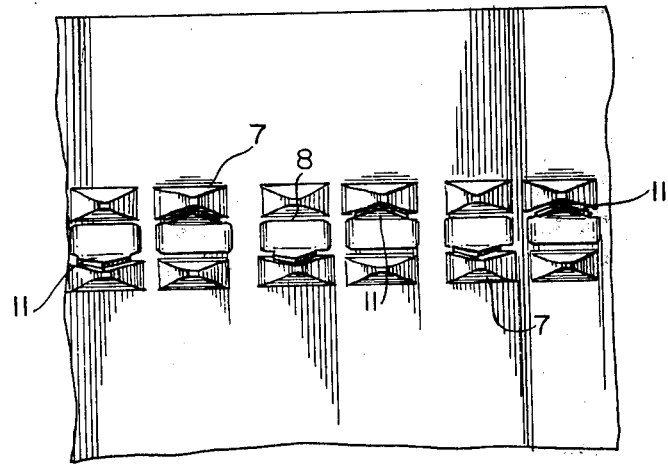
FIG. 6 is a plan view of the internal surface of a single slide suspension track.

It is well known in the art to use a single slide suspension rather than the aforementioned pair of slides 14. The single slide engages the centre portion of the track and the teeth or lugs on the internal surface of the track are arranged in two longitudinal, parallel rows as shown in FIG. 6. The cleats 8, which include guiding flanges 11 alternately on opposite sides, are arranged between the two rows of lugs 7 so that they engage the single slide.

From the foregoing description of the invention certain modifications may be readily apparent. For example, a second guiding flange may be used for contact with the opposite edge of the slide or, alternatively, a number of the staple cleats need have no guiding flanges at all. Similarly, although two teeth have been shown on the forward and trailing edges of the upper surface of the staple cleat, it is clear that one or a plurality greater than two could also be used. Furthermore, although the bearing surface part of the staple cleat is shown as having an elongate form, it need be only of a length sufficient to pass beneath the slide if two guiding flanges are used. Accordingly, the invention should be limited only by the scope of the appended claims.

What I claim as my invention is:

1. An endless snowmobile track of the internal drive type having at least one longitudinal row of drive lugs extending inwardly from the inside surface of the track, said lugs being positioned to be driven by a powered drive sprocket, said track further including an external ground engaging surface, a plurality of metallic staple cleats mounted on said track in at least one longitudinal row, said longitudinal row of cleats being spaced laterally from any longitudinal row of said drive lugs and positioned to slidingly contact a slide element of the suspension system of the snowmobile, each cleat having a bearing surface part positioned against the inner surface of the track and at least two integral teeth located on opposite sides of said bearing surface part extending substantially perpendicular thereto, said bearing surface part of each said staple cleat being elongate and upwardly convexly curved in the longitudinal direction of said track, and said teeth piercingly penetrating through the material of the track and the ends of said teeth grippingly engaging the material of said snowmobile track.

2. A snowmobile track as claimed in claim 1, wherein at least some of said staple cleats further comprise a first guiding flange extending outwardly and upwardly from one lateral edge of said bearing surface part, said flanges being adapted in operation to laterally contact a slide element of said suspension and thereby to guide said track.

3. A snowmobile track as claimed in claim 2 wherein at least some of said staple cleats further comprise a second guiding flange extending outwardly and upwardly from the opposed lateral edge of said bearing surface part.

4. A snowmobile track as claimed in claim 3, wherein at least some of said staple cleats comprise two teeth on the forward edge of said bearing surface part and two teeth on the rearward edge thereof, said teeth penetrating and grippingly engaging said snowmobile track.

5. A snowmobile track as claimed in claim 1, wherein said cleats are mounted on said track in two longitudinal, laterally spaced, parallel rows, the cleats of each row being adapted to slidingly contact a respective slide element of the suspension system.

6. In an endless snowmobile track of the internally driven type having at least one longitudinal row of drive lugs extending inwardly from the inside surface of the track, said lugs being positioned to be driven by a powered drive sprocket, said track further including an external ground-engaging surface, a plurality of metallic staple cleats mounted on said track in at least one longitudinal row, said longitudinal row of cleats being spaced laterally from any longitudinal row of said drive lugs and positioned to slidingly contact a slide element of the suspension system of the snowmobile, each said cleat having a bearing surface part adapted to slidingly contact said slide being elongate and upwardly convexly curved in the longitudinal direction of the snowmobile track, and at least two integral teeth located on the forward and rearward edges of the bearing surface part, said teeth piercingly penetrating through the material of the track and the ends of said teeth grippingly engaging said snowmobile track.

7. A snowmobile track as claimed in claim 6 wherein at least some of said staple cleats further comprise a first guiding flange extending outwardly and upwardly from one lateral edge of said bearing surface part, said flanges being adapted in operation to laterally contact said slide element and thereby to guide said track.

8. A snowmobile track as claimed in claim 7, wherein at least some of said staple cleats further comprise a second guiding flange extending upwardly and outwardly from the opposed lateral edge of said bearing surface part.

9. A snowmobile track as claimed in claim 6, wherein said cleats are mounted on said track in two longitudinal, laterally spaced, parallel rows, the cleats of each row being adapted to slidingly contact a respective slide element of the suspension system.

* * * * *